US005649238A

United States Patent [19]
Wakabayashi et al.

[11] Patent Number: 5,649,238
[45] Date of Patent: Jul. 15, 1997

[54] CAMERA HAVING BUILT-IN FLASH LIGHT EMITTING DEVICE FOR IMPROVING PICTURE QUALITY AND METHOD THEREOF

[75] Inventors: Hiroshi Wakabayashi, Yokohama; Hiroshi Terunuma, Ichikawa; Daiki Tsukahara, Hiratsuka; Shuji Iijima, Yokohama, all of Japan

[73] Assignee: Nikon Corporation, Tokyo, Japan

[21] Appl. No.: 709,115

[22] Filed: Sep. 6, 1996

Related U.S. Application Data

[63] Continuation of Ser. No. 308,216, Sep. 19, 1994, abandoned, which is a continuation of Ser. No. 120,347, Sep. 14, 1993, abandoned.

[30] Foreign Application Priority Data

Sep. 14, 1992 [JP] Japan ................ 4-269126
Feb. 25, 1993 [JP] Japan ................ 5-059321

[51] Int. Cl.$^6$ ................ G03B 15/02
[52] U.S. Cl. ................ 396/61; 396/176; 396/182
[58] Field of Search ................ 396/61, 176, 182

[56] References Cited

U.S. PATENT DOCUMENTS

| | | | |
|---|---|---|---|
| 5,016,037 | 5/1991 | Taniguchi et al. | 354/413 |
| 5,159,379 | 10/1992 | Shirane et al. | 354/132 X |
| 5,202,719 | 4/1993 | Taniguchi et al. | 354/413 |
| 5,262,809 | 11/1993 | Nishimura et al. | 354/132 |
| 5,347,339 | 9/1994 | Terada et al. | 354/132 |

*Primary Examiner*—Russell E. Adams

[57] ABSTRACT

A camera having a built-in first flash light emitting unit located directly above a photographic lens on the front surface of the camera body, and a second flash light emitting unit located at an upper corner of the front face of the camera body. The camera has autofocus capabilities, and reduces shadows created during close-up photography and reduces the "red eye" phenomenon created during far away photography through the control of each of the two flash light emitting units.

20 Claims, 7 Drawing Sheets

CAMERA HAVING BUILT-IN FLASH LIGHT EMITTING DEVICE FOR IMPROVING PICTURE QUALITY AND METHOD THEREOF

This application is a continuation of application Ser. No. 08/308,216, filed Sep. 19, 1994, now abandoned which is a continuation of application Ser. No. 08/120,347, filed Sep. 14, 1993, now abandoned.

BACKGROUND OF THE INVENTION

1. Field of the Invention

The present invention relates to a camera equipped with a built-in flash light emitting device (or "strobe"), and more particularly, to a camera equipped with plural distinct, individual flash light emitting units.

2. Description of the Related Art

In conventional cameras, a single flash light emitting unit is built-in to the front face of the camera body to provide sufficient light for exposing photographic film. The single flash light emitting unit has to be miniature in order to make the camera small, yet capable of emitting a powerful amount of light, so as to perform flash photography having a sufficient amount of light to illuminate a subject to be photographed. These conventional cameras, with a single flash emitting unit, cause few problems during normal photography (when the subject is further than a first prescribed distance and closer than a second prescribed distance), but cause significant problems during close-up photography (when the subject is quite close to the camera) and far-distance photography (when the subject is further than the second prescribed distance).

In the case of performing close-up photography (near distance photography), because direct powerful light illuminates the photographic subject, strong shadows border the photographic subject and show up strongly in the photograph, decreasing the quality of the photograph and causing it to look very unnatural.

Further, in the conventional cameras, a margin is not provided in the luminous intensity distribution characteristic relative to the field angle of the lens. The reason for this is to avoid the situation that, when the angle of luminous intensity is widened, a decrease in the amount of light results, so that a large capacitor becomes necessary, increasing the cost and resulting in a larger camera size.

To compensate for the distance apart of the lens of the above-mentioned camera and the single flash light emitting unit, the flash light emitting unit is located with an inclination slightly forward and downward, but when the photographic subject is closer than a particular distance at which the lens field angle and the strobe angle of luminous intensity intersect, it is not covered at the lower boundary by the light of the flash light emitting unit. Furthermore, when the flash light emitting unit is inclined even more forward and downward than above-mentioned, the upward-directed portion intersects the luminous intensity angle of the flash light emitting unit, and when the photographic subject is further than the intersection distance, the subject is not covered at the upper boundary by the light of the flash light emitting unit.

In order to prevent strong shadows, the photographic lens and the flash light emitting unit may be brought as close together as possible, but in the case that a human figure is to be photographed from further than a given distance, the "red eye" phenomenon is unavoidable. Therefore, conventional cameras with single flash light emitting units either generate strong shadows during close-up photography or a "red eye" effect during far away photography of human figures.

SUMMARY OF THE INVENTION

It is therefore an object of the present invention to provide a camera having a built-in flash light emitting device with which flash photography having natural shadows is possible.

It is a further object of the present invention to provide a camera having a built-in flash light emitting device with which flash photography over a wide range of photographic distances is possible to produce pictures of high quality.

Another object of the present invention is to provide a camera having a built-in flash light emitting device able to prevent the "red eye" phenomenon when a human figure is far away from the camera.

Still another object of the present invention is to provide a camera having a built-in flash light emitting device having a built-in flash light emitting device with which flash photography over a wide range of photographic distances is possible while maintaining a compact size of the camera.

The above objects are achieved by providing a built-in flash light emitting device comprising both a first flash emitting unit and a second flash light emitting unit built-in on the front face of the camera. The first flash emitting unit and the second flash emitting unit are different distances from the photographic lens of the camera, each flash emitting unit providing a different function.

The first flash emitting unit, located near the photographic lens, is used during close-up photography to prevent strong shadows from being created at the boundaries of the subject to be photographed, and thus produce a photograph of higher quality than previously attained.

The second flash emitting unit, spaced further from the photographic lens then the first flash emitting unit, emits light whenever flash photography is required. The second flash emitting unit provides light on the subject to be photographed, and also prevents the "red eye" phenomenon by being spaced apart from the photographic lens.

In a camera having autofocus capability, the first flash light emitting unit can be placed between an autofocus light projection window and an autofocus light receiving window on the front face of the camera, thus minimizing the size required for the camera to attain its objectives.

BRIEF DESCRIPTION OF THE DRAWINGS

These and other objects and advantages of the present invention will become apparent and more readily appreciated from the following description of preferred embodiments, taken in conjunction with the accompanying drawings, of which.

DETAILED DESCRIPTION OF THE PREFERRED EMBODIMENTS

Figure 1:
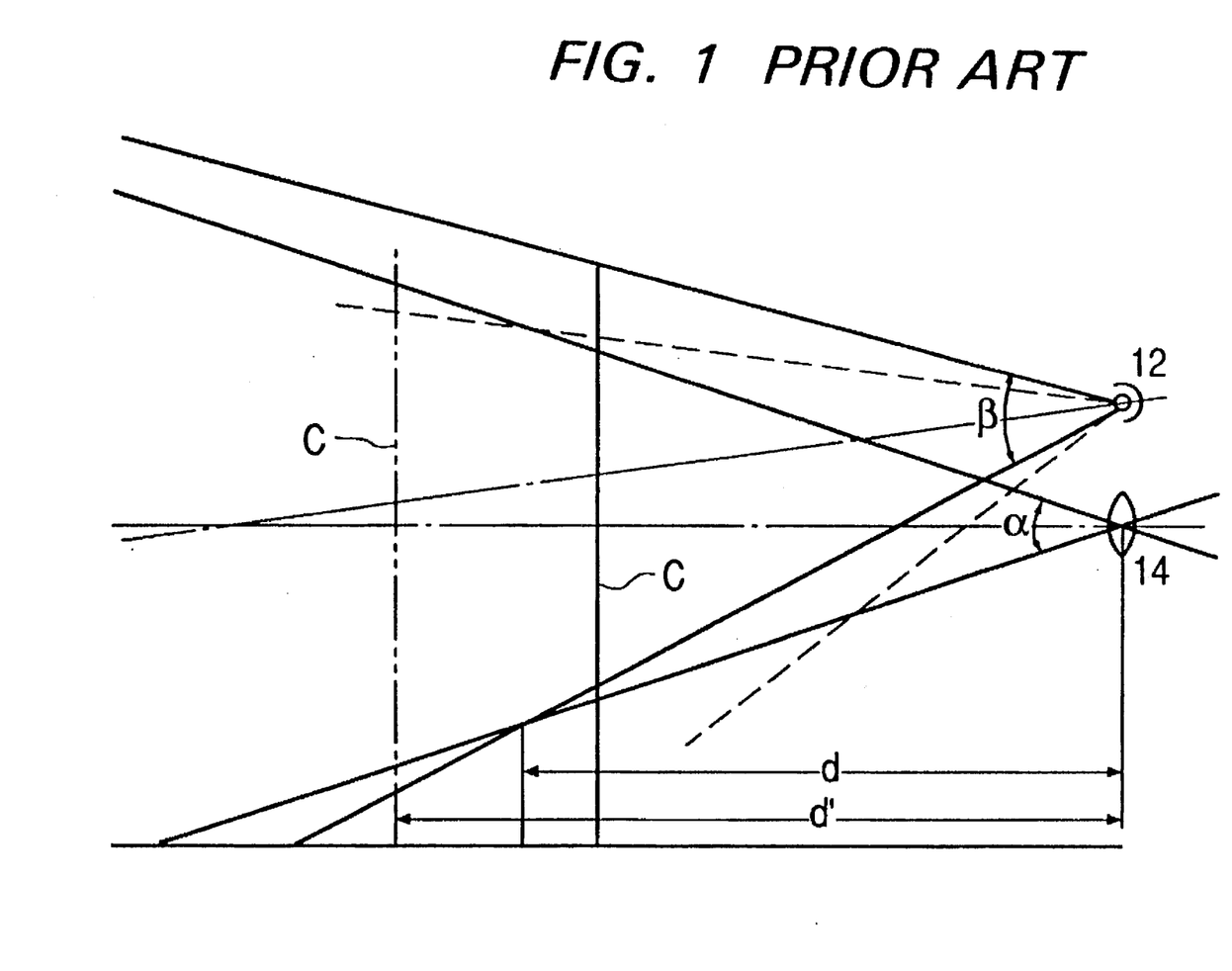
FIG. 1 is a schematic side view showing the relationship between the flash illumination angle of a flash light emitting unit and the lens field angle of a photographic lens in a conventional camera.

As shown in FIG. 1, a conventional camera having a single flash light emitting unit 12 and a lens 14, is directed at a subject C. The single flash light emitting unit 12 is located directly above the lens 14. To compensate for the distance between the lens 14 and the flash light emitting unit 12, the flash light emitting unit is inclined slightly forward and downward, but when the subject C is closer than a distance d at which the lens field angle α and the flash illumination angle β intersect, the lower boundary of the subject C is not illuminated. Furthermore, when the flash light emitting unit is inclined even more forward and downward, as shown by the broken lines in FIG. 1, and the subject C is at a distance d', the upper boundary of the subject is not illuminated, thus resulting in shadows on the film.

Figure 2:
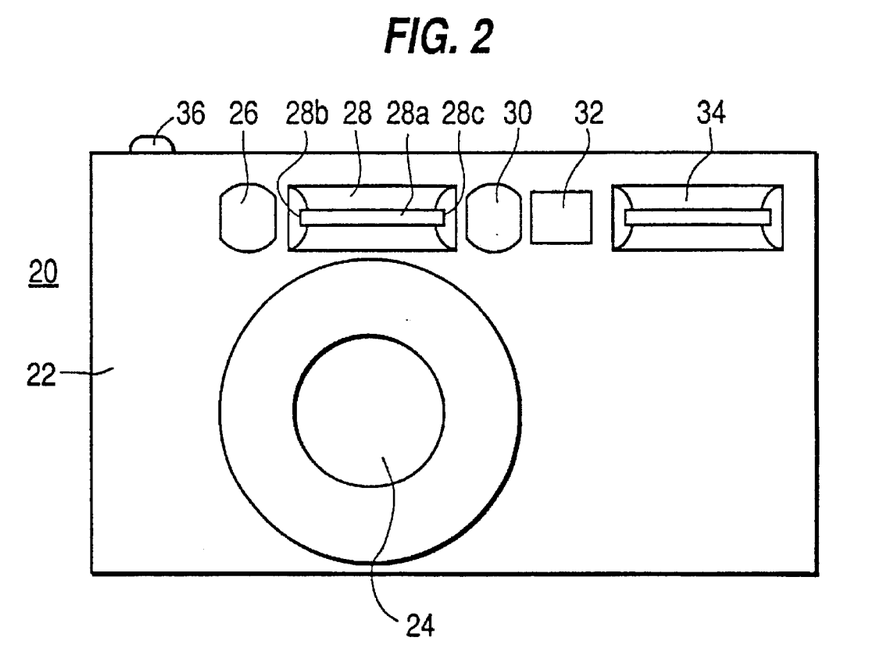
FIG. 2 is a cross-sectional schematic front view of a camera having a built-in flash emitting device according to a first embodiment of the present invention.

FIG. 2 illustrates a first embodiment of a camera having a built-in flash light emitting device, in accordance with the present invention. The camera 20 has a photographic lens 24 in a lens barrel at the approximate center of the front surface of camera body 22.

The photographic lens 24 is constituted, for example, by a zoom lens or a single-focus lens, and furthermore is effective in close-up photography at 50 cm or less, as the distance at which photography is possible, but is also constituted such that in portrait photography, which is the usual photography, it can be set to a photographic distance of about 1–1.5 m.

Furthermore, in the front surface upper portion of the camera body 22, there are arranged in succession, transversely from left to right, looking at the front view in FIG. 2 of the camera 20, a light projection window 26 of an autofocus device ("AF" hereinafter), a first flash light emitting unit 28, a light receiving window 30 of the AF, a viewfinder window 32, and a second flash light emitting unit 34. The light projection window 26 and light receiving window 30 of the AF, by rangefinding the focusing distance of the photographic subject, perform automatic focusing of the photographic lens 24 by drive control from a control unit (not shown in the drawings).

The first flash light emitting unit 28 is located between the light projecting window 26 and light receiving window 30, so as to be approximately parallel to the long side of the photographic image frame, and approximately directly above the optical axis of the photographic lens 24. In this instance, the long side of the photographic image frame is parallel to the photographic film feeding direction. However, the position in which the first flash light emitting unit 28 is located may not be precisely directly above the photographic lens 24. As long as the perpendicular plane defined by the optical axis and a first line perpendicular to both the optical axis and the long side of the photographic image frame (also the film running direction) and containing the optical axis of the photographic lens 24 passes through a portion of an electrical discharge tube 28a constituting the light emitting unit which lies between two discharge electrodes 28b, 28c, the position of the first flash light emitting unit 28 may be shifted to a greater or lesser degree to the left or to the right. Furthermore, only in close-up photography, when the distance of the photographic subject is closer than a prescribed distance, is the first flash light emitting unit 28 used together with the second flash light emitting unit 34, and because of this, the first flash light emitting unit 28 is located inclined forward and downward, such that it has an effective luminous intensity distribution characteristic relative to the lens field angle.

Because, as mentioned above, the first flash light emitting unit 28 is located between the light projection window 26 and the light receiving window 30 of the AF, the baseline length of the AF can be made sufficiently large, so that the accuracy of the AF is increased. Moreover, the first flash light emitting unit 28 can effectively use the space, empty in prior art cameras, between the light projection window 26 and the light receiving window 30 of the AF.

The second flash light emitting unit 34 is positioned similarly as in the conventional camera, namely, in a position to one side (to the right in FIG. 2) at the upper part of the front surface of the camera body 22, horizontally located approximately parallel to the long side of the same image plane with the light projection window 26, first flash light emitting unit 28 and the light receiving window 30. Then, this second flash light emitting unit 34 is constituted such that in close-up photography it emits light simultaneously with the first flash light emitting unit 28, and during far distance photography it alone emits light. Moreover, reference numeral 36 in FIG. 2 identifies a release button for the camera.

Figure 3:
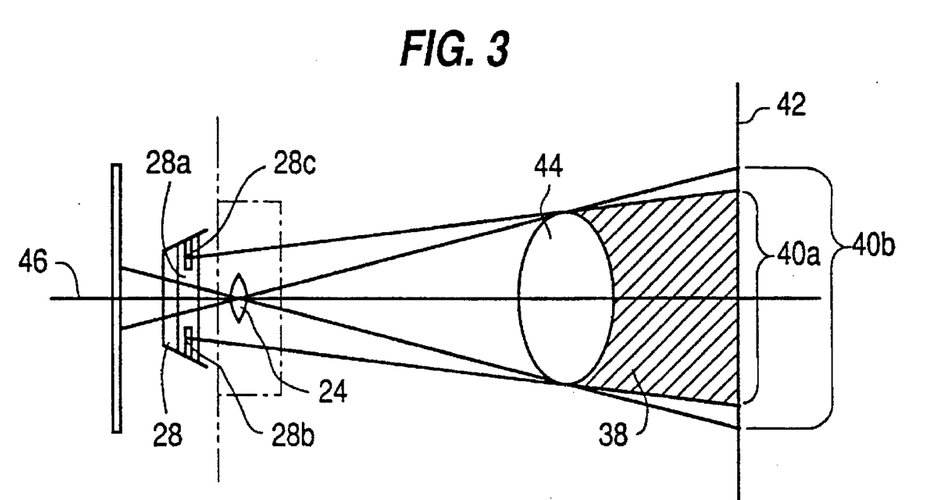
FIG. 3 is a cross-sectional schematic top view of the camera of FIG. 2 showing the shadow due to the first flash light emitting unit and the photographic range.

In the case in which the first flash light emitting unit 28 emits light, as shown in FIG. 3, a shadow 38 occurs in the range 40a on the background 42 rearward of the photographic subject 44. However, the electrodes 28b, 28c are in a position with the optical axis 46 of the photographic lens 24 lying between them, and the range photographed by means of the photographic lens 24 is the range 40b; this photographic range 40b is wider than the shadow range 40a, and accordingly the shadow 38 is not photographed.

Figure 4:
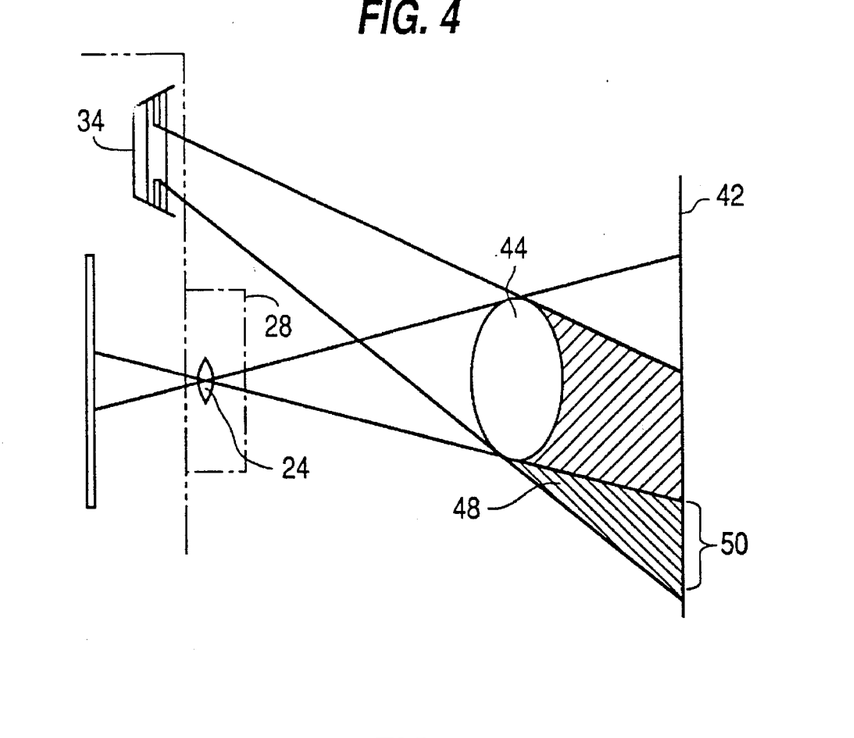
FIG. 4 is a cross-sectional schematic top view of the camera of FIG. 2 showing a shadow due to the first flash light emitting unit and the photographic range.

FIG. 4 shows a schematic top view of the first and second flash light emitting units 28 and 34, respectively, and the resultant shadow due to the second flash light emitting unit 34 during close-up photography. The shadow 48 is formed in the range 50 due to the light emitted by the second flash light emitting unit 34, but because, as mentioned above, the first flash light emitting unit 28 emits light simultaneously, this shadow 48 is illuminated by the light of the first flash light emitting unit 28 and becomes a faint shadow, and a very natural photograph is obtained.

Figure 5:
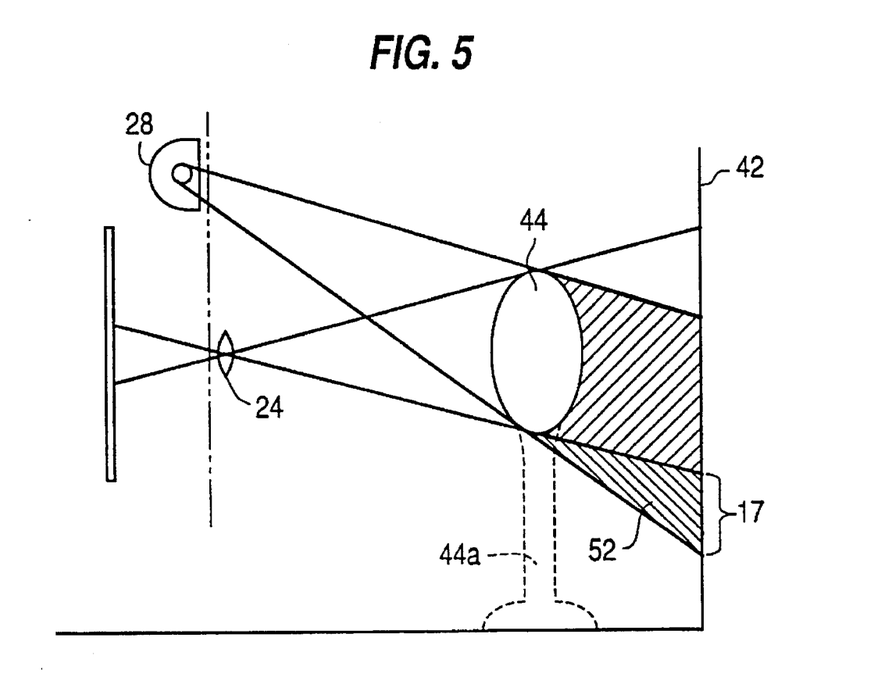
FIG. 5 is a cross-sectional schematic side view of the camera of FIG. 2 showing the shadow due to the first flash light emitting unit and the photographic range.

FIG. 5 is a cross-sectional schematic side view of the first flash light emitting unit 28 and the photographic lens 24. When the first flash light emitting unit 28 emits light, a shadow 52 occurs in the range 17; because the shadow 52 becomes the ground surface side in normal photography, the base portion 44a of the photographic subject 44 is hidden, and the photograph does not become unnatural.

The amount of light emitted by the first flash light emitting unit 28 and the second flash light emitting unit 34 is effectively determined to be by experiment, approximately the same quantity of light, but the ratio of the amount of light may be changed according to the positional relationship of respective flash light emitting units 28 and 34 and the photographic lens 24.

Moreover, because the shadow does not come out in the case when light is emitted only by the first flash light emitting unit 28, as described for FIG. 3, the photograph of the photographic subject 44 becomes flat in appearance, and a natural photograph is not obtained.

Here, the positions in which the first and second flash light emitting units are located do not include positions symmetrically to the right and left, with the photographic lens lying between them, on the same straight line passing through the optical axis of the lens. The reason for this is that, in the case of the right and left symmetrical positions with the photographic lens lying between them, or on the same straight line passing through the optical axis of the lens, shadows occur on both sides of the photographic subject and it becomes an unnatural photograph; in the case of positions on the straight line passing through the optical axis of the lens, with the lens lying between and disposed juxtaposed to their end sides, it is because the shadows occur at approximately the same position on the photographic subject, and the arrangement of the plural flash light emitting units becomes meaningless.

In far distance photography, when the photographic subject is separated from the photographic lens 24 by more than a prescribed distance, only the second flash light emitting unit 34, which is further from the photographic lens, emits light, and flash photography is performed. At this time, because the first flash light emitting unit 28 does not emit light, the occurrence of the "red eye" phenomenon can be prevented in the case when the photographic subject is a human figure, and photography providing good photographs can be performed.

Moreover, even in the case of photography in the dark, when flash photography is necessary, what is called the "red eye" phenomenon, in which, because the pupils are open, the flash light entering the eyeball from the pupil is reflected and returns to the camera as the red photograph phenomenon, tends to appear when the distance between the photographic lens and flash light emitting unit is close. Furthermore, it is well known that this kind of "red eye" phenomenon occurs when the angle between the flash light emitting unit and the photographic lens, relative to the photographic subject, is 2° or less.

Figure 6:
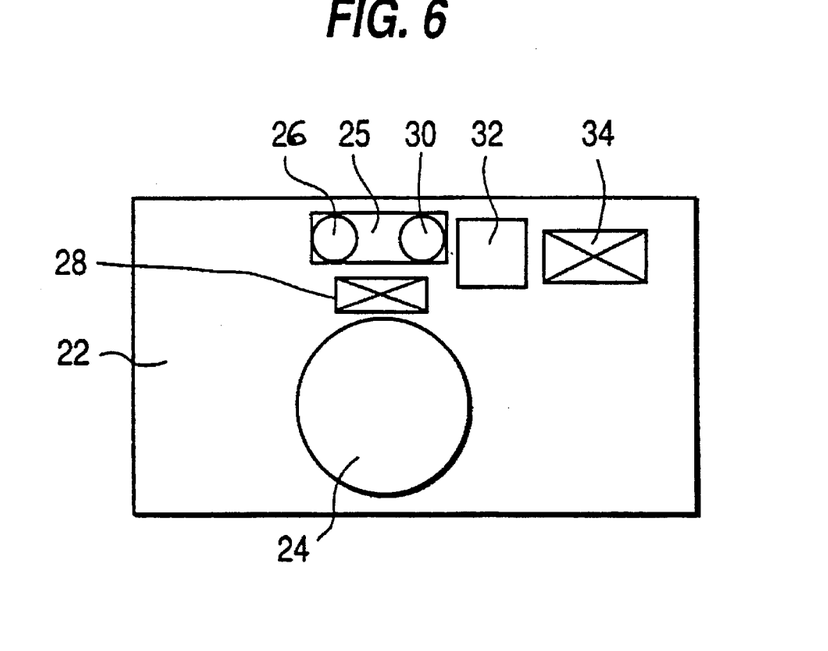
FIG. 6 is a cross-sectional schematic front view of a camera having a built-in flash light emitting device, according to a second embodiment of the present invention.

FIG. 6 is a front view of a second embodiment of the present invention. This embodiment is one in which the camera has an AF unit 25 consisting of a light projection window 26 and a light receiving window 30 located above the first flash light emitting unit 28. Its constitution is otherwise the same as that of the above-mentioned first embodiment.

This kind of constitution has the advantage that the width of the camera body 22 can be made even smaller.

Figure 7:
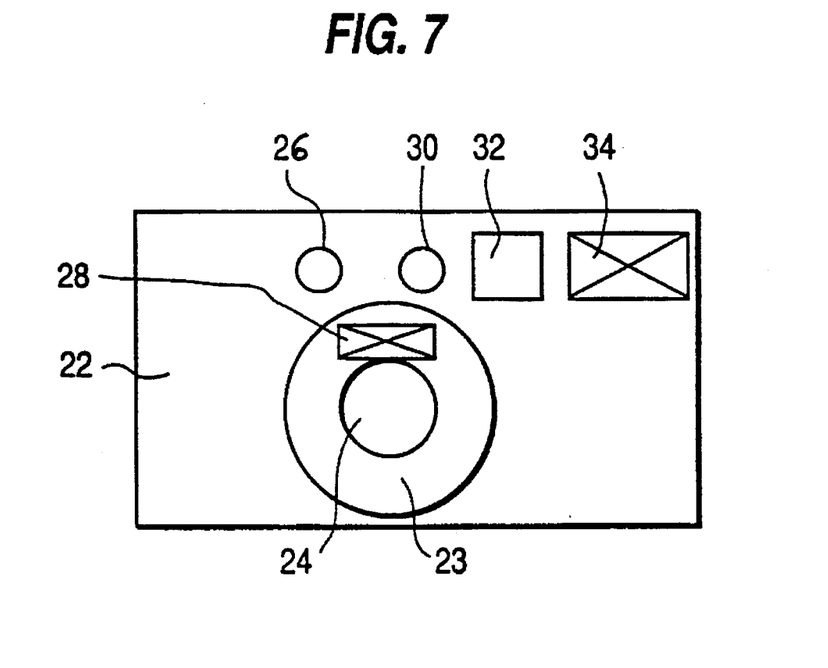
FIG. 7 is a cross-sectional schematic front view of a camera having a built-in flash light emitting device, according to a third embodiment of the present invention.

FIG. 7 is a front view of a third embodiment of the present invention. In this embodiment, the camera has a first flash light emitting unit 28 inserted into the head of a photographic lens barrel 23.

In this arrangement, because the first flash light emitting unit 28 is conveniently close to the photographic lens 24, it is effective in extinguishing the shadow.

Moreover, in both the first and second embodiments of the present invention, the first flash light emitting unit 28 has been located directly above the photographic lens 24, but is not limited to this, and may also be directly below the photographic lens.

By means of the first two embodiments of a camera having a built-in flash light emitting device as described above, equipped with at least two flash light emitting units, because the first flash light emitting unit is located directly above or directly below the lens such that the perpendicular plane containing the optical axis of the photographic optical system passes through the first flash light emitting unit, and with a second flash light emitting unit located in a position the aforementioned perpendicular plane does not pass through, even with a simple construction, flash photography is possible with the performance of optimum flash light illumination, according to photographic conditions from far distance photography up to near distance photography (close-up photography), and in particular, the luminous intensity distribution characteristic during close-up photography is good, and photographs having natural shadows can be obtained.

Still another embodiment of the camera of the present invention, to make quality flash photography possible, has plural flash light emitting units which are different in distance and different in function from one another, and furthermore has a control unit arranged to use these individually or in combination for illumination of the photographic subject, according to the photographic subject conditions.

Figure 8:
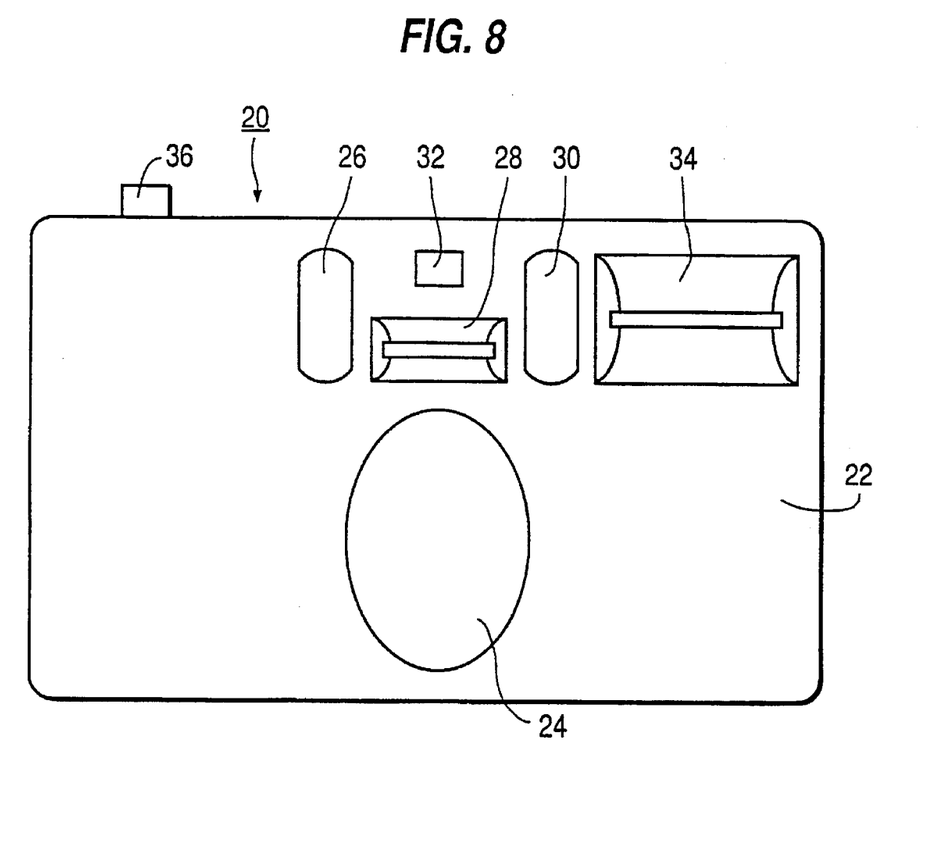
FIG. 8 is a cross-sectional schematic front view of a camera having a built-in flash light emitting device, according to a fourth embodiment of the present invention.

FIG. 8 shows a front view of a fourth embodiment of the camera according to the present invention, wherein the camera 20 has a photographic lens 24 retained by a lens barrel located in the front center of camera body 22.

Here the photographic lens 24 is constituted, for example, by a zoom lens or a single focus lens; furthermore, the camera of FIG. 8 is effective not only in macro photography (close-up photography) with 50 cm or less as the distance at which photography is possible, but also in portrait photography, which is normal photography, such that the photographic distance is about 1–1.5 m to the subject.

Furthermore, AF rangefinder light windows 26 and 30 are oppositely arranged, above the photographic lens 24 in the front surface of the above-mentioned camera body 22, and through these AF rangefinder light windows 26 and 30, by measurement of the focusing distance to the photographic subject, automatic focusing of the photographic lens 24 is performed by drive control from a control unit (not shown in the drawings).

Moreover, viewfinder window 32, arranged in the front surface of the camera body 22, in the present embodiments, is located approximately directly above the optical axis of the photographic lens 24, has a small parallax with the photographic lens, and is constituted to be suitable for close-up photography; and furthermore, by being located close to the second flash light emitting unit 28, the parallax with this second flash light emitting unit 28 is also small, so that it becomes possible, particularly in close-up photography, to correctly view the photographic subject. Reference numeral 36 again illustrates a release button for the camera.

First and second flash light emitting units 28 and 34, similar to the first three embodiments, are located at different distances from the photographic lens 24, and furthermore are arranged to be different in function.

Here the second flash light emitting unit 34 is arranged in a normal position towards one side (the right-hand side in FIG. 8) of the camera body 22. The first light emitting unit 28 is arranged at the upper side of the photographic lens and in a position closer than the viewfinder window 32, approximately directly above the optical axis, similar to the first three embodiments. In contrast to the first three embodiments, however, for the first flash light emitting unit 28, the amount of light emission in the full light emission case may be smaller than the amount of light emitted by the second flash light emission unit 34.

Moreover, the amount of light emitted by the second flash light emitting unit 34, is selected in dependence upon a first set of guide numbers 1–8, while for the first flash light emitting unit 28, the various amounts of light necessary for close-up photography through far-away photography may be given by a second set of guide numbers 1–4.

Figure 9:
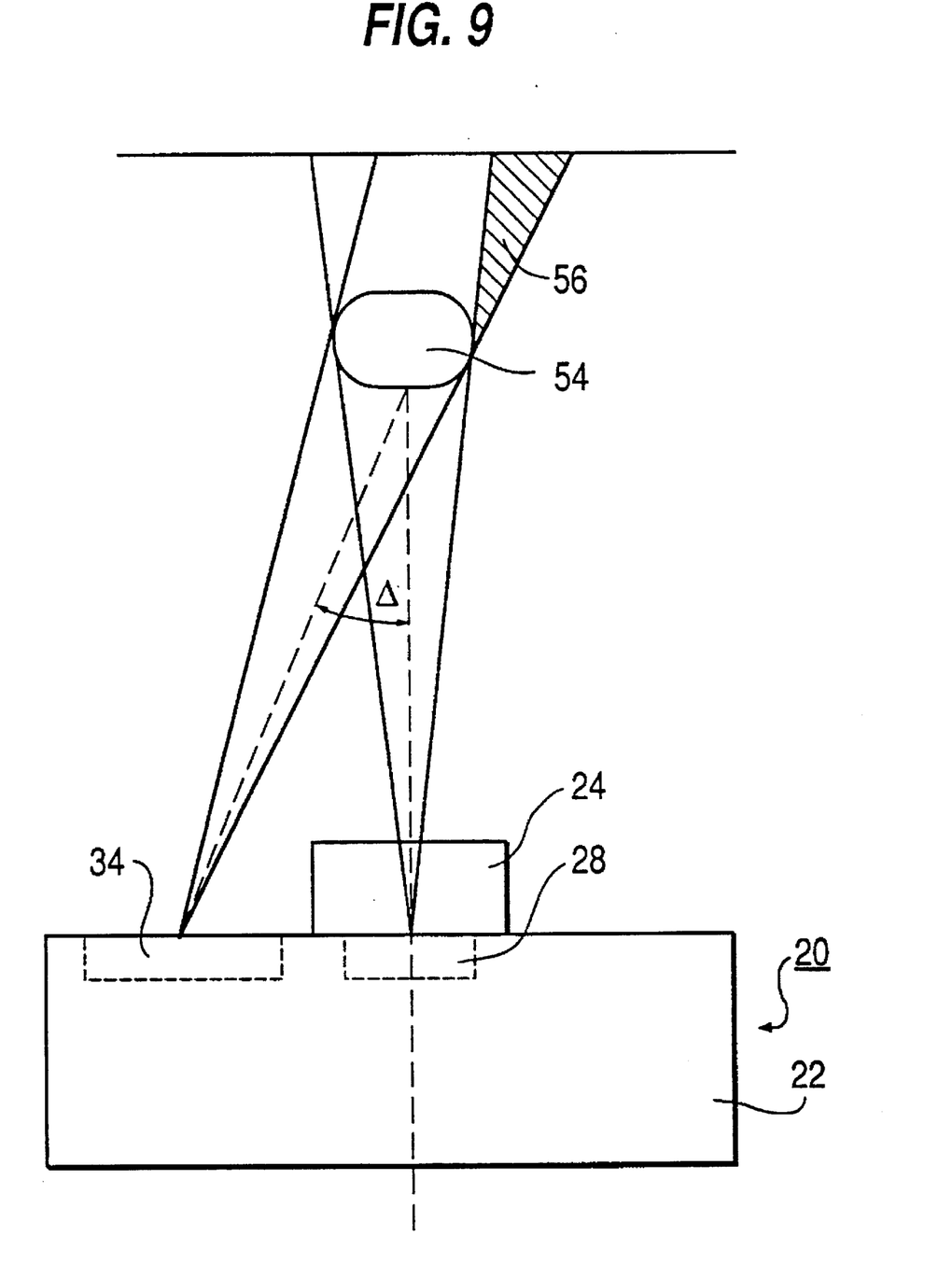
FIG. 9 is a cross-sectional schematic top view of the camera of FIG. 8 showing the shadow due to the second flash light emitting unit.

Looking at FIG. 9, in a conventional camera, a single flash emitting unit is arranged in a position separated from the photographic lens 24 (the position of the second flash light emitting unit 34 of the present embodiment). This is in order to prevent the "red eye" phenomenon of flash photography when the flash emitting unit is too close to the photographic lens. It is well known that such a "red eye" phenomenon arises when the angle (A) between the flash light emitting unit 34 and the photographic lens is 2° or less.

Accordingly, in a conventional camera with a flash light emitting unit 34 built-in, because the distance between the flash light emitting unit 34 and the photographic lens is about 65 mm, the "red eye" phenomenon arises when a figure (photographic subject 54) is further than about 1.8 m (=65/tan 2°).

Then, when the flash light emitting unit and the photographic lens are closer together, because the "red eye" phenomenon occurs at a closer focusing distance, the "red eye" phenomenon occurs more frequently, and moreover because the photographic subject 54 is close, the photographic subject 54 is photographed large, and the "red eye" phenomenon tends to become conspicuous. Because of this, it is desirable to make the separation of the flash light emitting unit 34 and the photographic lens as large as possible.

However, in contrast to this, when the distance between the second flash light emitting unit 34 and the photographic lens 24 is made large, a strong shadow 56 occurs at the rear surface side of the photographic subject 54, on the opposite side to that included between the flash light emitting unit 34 and the optical axis; this is illuminated in the background, and a black border on the photographic subject 54 can result.

In particular, such a problem, in the case of performing close-up photography, is that a shadow 56 comes out and becomes a black border in the background around the photographic subject 54, and a very poor photograph is obtained.

In order to remedy this kind of disadvantage, in the present fourth embodiment of the invention, the first flash light emitting unit 28, added to the front face of the camera 22 along with the second flash light emitting unit 34, is arranged at a different distance from the photographic lens 24, and by the simultaneous emission of light by both of them, the shadow 56 which became a problem in the aforementioned conventional camera, can be abated. In FIG. 9, this is clear from the range of light quantity illumination from the first flash light emitting unit 28.

Moreover when, to deal only with the problem of the above-mentioned shadow 56, the second flash light emitting unit 34 is caused not to emit light, and only the first flash light emitting unit 28 is caused to emit light, there results no appearance of solidity in the image of the photographic subject. Furthermore, when the first flash light emitting unit 28 is made the main one, and the second flash light emitting unit 34 is made a secondary one, photographically good effects are obtained. In this instance, the amount of light of the second flash light emitting unit 34 is made about ½, relative to the amount of light of the first flash light emitting unit 28.

Possible methods of making the amount of light of the second flash light emitting unit 34 small, in comparison with the amount of light of the first flash light emitting unit 28, are to change the timing of the light emission relative to the shutter opening waveform, or to change the amount of light by means of a light adjusting stop, and other well-known techniques.

The states of light emission by the first and second flash light emitting units 28 and 34 (abbreviated as SB1, SB2), as mentioned below, are shown in the following Table 1.

TABLE 1

|  | Far<br>X > L1 | Middle<br>L1 ≧ X > L2 | Near<br>L2 ≧ X |
| --- | --- | --- | --- |
| SB1 | Red eye | — | Full |
| SB2 | Full | Full | Weak |

Here "Full" denotes a state of light emission with the maximum amount of light; "Red eye" denotes the state in which, because of pre-emission of light, the red eye phenomenon is abated; and "Weak" denotes a state of weak light emission in order to extinguish the shadow (56 in FIG. 9) during close-up photography.

Furthermore, L1 denotes the limiting distance at which the red eye phenomenon occurs, and L2 denotes the limiting distance of the macro photography region of close-up photography; with the distance X to the photographic subject positioned at any one of a far (X>L1), middle (L1≧X>L2), or near (L2≧X) location, each flash light emitting unit may be made to emit light as shown in Table 1. Moreover, the above-mentioned L1 is determined from the approach to the limiting distance of the flash light during weak light emission, or from the range of possible uses of the photographic lens.

Figure 10:
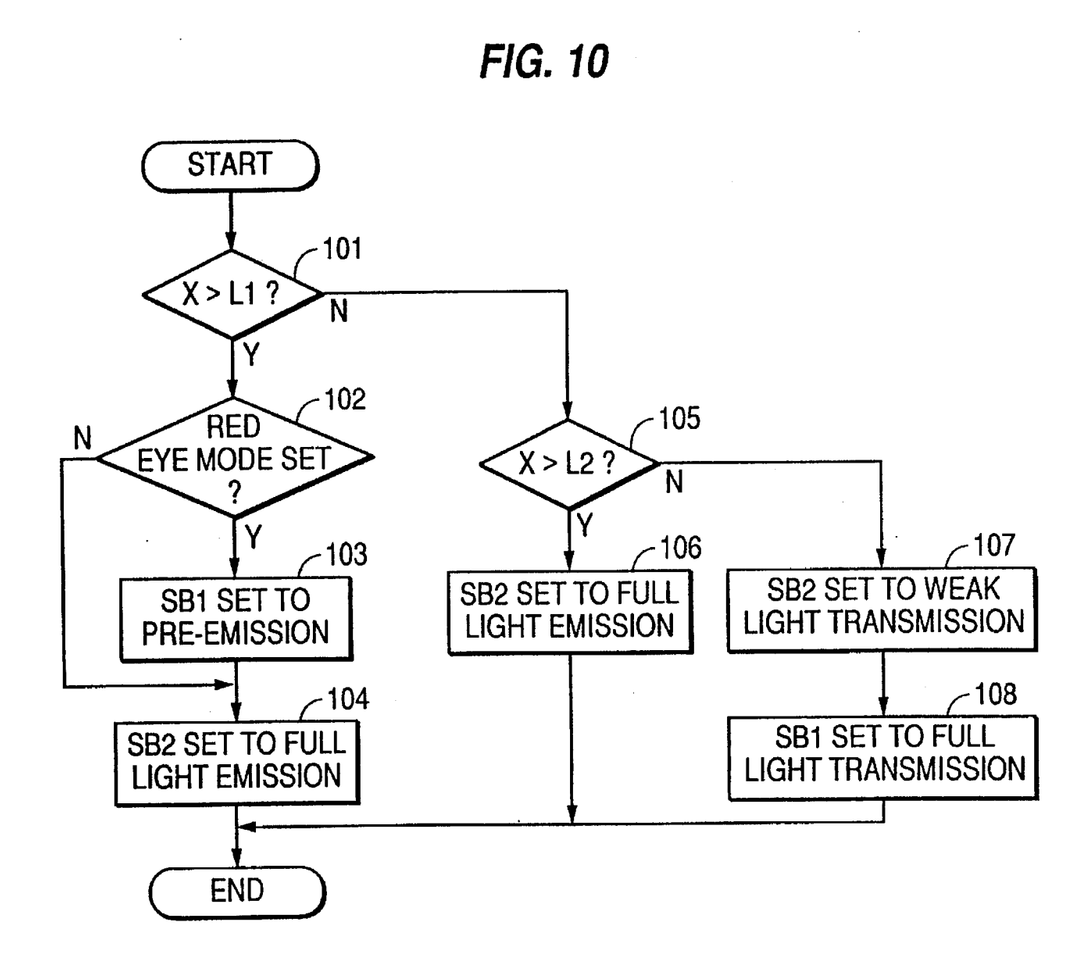
FIG. 10 is a flow chart showing the operation of the first and second flash light emitting units of the camera of FIG. 8.

FIG. 10 is a flow chart of control steps employed to perform light emission control of the first and second flash light emitting unit 28 and 34 as shown in the above-mentioned Table 1.

To start, it is determined in step 101 whether the distance X to the photographic subject is further or nearer than L1; when it is further, advancing to step 102, it is determined whether or not the red eye mode has been set. Then, if the red eye mode has been set, by means of step 103, red eye abatement pre-emission of light by the first flash light emitting unit 28 (SB1) is set and, properly after, in step 104 the second flash light emitting unit 34 (SB2) is made to give full light emission, and flash photography is performed. Furthermore, when the red eye mode has not been set, the red eye abatement pre-emission of light by the first flash light emitting unit 28 (SB1) is not performed in the above-mentioned step 103, and in step 104 the second flash light emitting unit 34 (SB2) is made to give full light emission, and flash photography is performed.

On the other hand, when in step 101 the distance X to the photographic subject is L1 or less, advancing to step 105, it is determined whether this distance X is further or closer than L2. Then, when the distance X is determined to be further than L2, in step 106 the second flash light emitting unit 34 (SB2) is made to give full light remission, and flash photography is performed.

Furthermore, when the distance X is determined to be closer than L2, as shown in steps 107 and 108, the second flash light emitting unit 34 (SB2) is made to give weak light emission, and in addition the first flash light emitting unit 28 (SB1) is made to give full light emission, and flash photography is performed.

By means of the above constitution, very natural flash photographs can be obtained in near distance photography. Furthermore, if the distance of the second flash light emitting unit 34 and the photographic lens 24 is more widely separated, the distance at which the red eye phenomenon arises can also be further, so that the camera of the present invention is also effective in far and middle distance photography such as portrait photography.

Moreover, the pre-emission of light by the first flash light emitting unit 28, in order to prevent the red eye phenomenon caused by the proximity to the photographic lens 24, is more effective; for example, when during photography from a position further than the prescribed distance L1, the angle α given by the second flash light emitting unit 34 and the optical axis of the photographic lens 24 is less than the angle at which the red eye phenomenon arises during photography, the two flash light emitting units 28 and 34 can also be made to emit light simultaneously, so that a diversification during flash photography is provided for.

Moreover, with regard to the occurrence of the red eye phenomenon, in spite of the pre-emission of light from the first flash light emitting unit not being perfect, various other conditions may be additionally controlled.

Moreover, the present invention is not limited by the structure of the above-mentioned embodiments, and it goes without saying that modifications and changes can be made to the form and structure, etc., of each portion of the camera 20 with which flash photography is possible. For example, at least in the aforementioned fourth embodiment, the first and second flash light emitting units 28 and 34 have been described in which they have been arranged in a position partially to one side of the optical axis, and a position corresponding to the optical axis of the photographic lens, respectively, but the present invention is not limited by this, and at least two flash light emitting units can be arranged at different positions on the front surface of the camera body, and various modifications are possible as to number and respective arrangement positions.

Furthermore, with regard to the control of the light emission of the first and second flash light emitting units 28 and 34, only in the case when the lens is further than the prescribed distance L1 from the photographic subject are there no limitations on possible use, and instead, the angle of luminous intensity distribution can be curtailed, accordingly conferring the advantages of making the capacitor small, the battery life longer, etc.

Thus, it is intended that the present invention cover the modifications and variations in the camera in accordance with the invention within the scope of the appended claims and their equivalents and without limitation to the different environments in which to use the camera.

What is claimed is:

1. A camera having a built-in flash light emitting system, for taking a photograph of a subject, the camera comprising:

a lens having an optical axis;

a first flash light emitting unit intersected by a perpendicular plane defined by said optical axis and a first line perpendicular to both said optical axis and a long dimension of a photographic image frame;

a second flash light emitting unit located at a front surface of the camera, and spaced away from said perpendicular plane;

a distance determining unit to determine a distance of the subject from the camera; and wherein said first flash light emitting unit and said second flash light emitting unit simultaneously emit light only when said distance determining unit determines that the subject is closer to the camera than a first prescribed distance.

2. The camera as claimed in claim 1, further comprising:

an autofocus unit including said distance determining unit, to adjust a focus of the lens; and wherein said first flash light emitting unit is positioned adjacent to said autofocus unit.

3. The camera as claimed in claim 2, wherein said autofocus unit further comprises:

a light projecting unit to send out light; and a light receiving unit to receive the light sent out by said light projecting unit; and wherein said first flash light emitting unit is positioned between said light projecting unit and said light receiving unit.

4. The camera as claimed in claim 1, wherein when the subject is closer to the camera than the first prescribed distance, said first flash light emitting unit has an effective luminous intensity distribution characteristic related to a lens field angle of the lens.

5. The camera as claimed in claim 1, wherein a first total light emission quantity of said first flash light emitting unit is less than a second total light emission quantity of said second flash light emitting unit.

6. The camera as claimed in claim 1, further comprising:

a control unit to control emission of light from said first and second flash light emitting units; and wherein, during photography, said control unit causes only said second flash light emitting unit to emit light when the subject is further than a second prescribed distance and said control unit causes said first and second flash light emitting units to emit light when the subject is closer than said first prescribed distance, said first prescribed distance being less than said second prescribed distance.

7. The camera as claimed in claim 6, wherein, during photography, said control unit causes said second flash light emitting unit to emit light and said first flash light emitting unit to pre-emit light when the subject is further than said second prescribed distance, and said control unit causes only said second flash light emitting unit to emit light when the subject is between said first and second prescribed distances.

8. A camera having a built-in flash system, for photographing a subject, the camera comprising:

a lens having an optical axis;

a first flash unit intersected by a perpendicular plane defined by said optical axis and a first line perpendicular to both said optical axis and a film running direction;

a second flash unit located on the front surface of the camera and spaced away from said perpendicular plane; and wherein said first and second flash units simultaneously emit light, during photography, when the subject is closer than a first prescribed distance from the camera, and only said second flash unit emits light, during photography, when the subject is further than said first prescribed distance from the camera.

9. The camera as claimed in claim 8, wherein a total amount of light emitted by said first flash unit is approximately the same as the amount of light emitted by said second flash unit.

10. The camera as claimed in claim 8, wherein:

only said second flash unit emits a first amount of light when the subject is greater than said first prescribed distance from the camera; and said second flash unit emits a second amount of light less than said first amount of light and said first flash unit emits said first amount of light when the subject is less than said first prescribed distance.

11. The camera as claimed in claim 8, wherein:

said second flash unit emits a first amount of light when the subject is greater than said first prescribed distance from the camera and a second amount of light less than said first amount of light when the subject is less than said first prescribed distance, said first flash unit pre-emits light before photography when the subject is greater than a second prescribed distance greater than said first prescribed distance and does not emit light when the subject is between said first and second prescribed distances and emits said first amount of light when the subject is less than said first prescribed distance from the camera.

12. The camera as claimed in claim 8, wherein:

during a first mode, only said second flash unit emits a first amount of light when the subject is greater than said first prescribed distance from the camera and said second flash unit emits a second amount of light less than said first amount of light and said first flash unit emits said first amount of light when the subject is less than said first prescribed distance; and during a second mode, said second flash unit emits said first amount of light when the subject is greater than said first prescribed distance from the camera and said second amount of light less than said first amount of light when the subject is less than said first prescribed distance, and said first flash unit pre-emits light before photography when the subject is greater than a second prescribed distance greater than said first prescribed distance and does not emit light when the subject is between said first and second prescribed distances and emits said first amount of light when the subject is less than said first prescribed distance from the camera.

13. The camera as claimed in claim 8, further comprising:

an autofocus unit to adjust the lens and to determine a distance between the lens and the camera, said autofocus unit including:

a light projection window to project light; and a light receiving window to receive reflected light projected from the light projection window; and wherein said first flash unit is positioned between said light projection window and said light receiving window.

14. The camera as claimed in claim 8, further comprising:

an autofocus unit to adjust the lens and to determine a distance between the lens and the camera, said autofocus unit including:

a light projection window to project light; and a light receiving window to receive reflected light from the light projection window; and wherein said first flash unit intersects a plane encompassing said optical axis and running between said light projection window and said light receiving window, said first flash unit positioned on a side of said lens opposite said light projection window and said light receiving window.

15. The camera as claimed in claim 11, further comprising:

an autofocus unit to adjust the lens and to determine a distance between the lens and the camera, said autofocus unit including:

a light projection window to project light; and a light receiving window to receive reflected light from the light projection window; and wherein said first flash unit is positioned between said light projection window and said light receiving window.

16. A method of controlling a first flash unit positioned adjacent to a lens of a camera and a second flash unit positioned a distance further than the first flash unit from the lens, the method comprising:

making a first determination whether the subject is greater than a first distance from the camera;

emitting a first amount of light from said second flash unit if said first determination is true;

making a second determination whether the subject is greater than a second distance from the camera less than said first distance if said first determination is false;

emitting said first amount of light from said second flash unit and no light from said first flash unit if said second determination is true; and emitting said first amount of light from said first flash unit and a second amount of light less than said first amount of light from said second flash unit if said second determination is false.

17. The method as claimed in claim 16, further comprising:

pre-emitting light from said first flash unit when said first determination is true and said camera is set to a first mode; and emitting no light from said first flash unit when said first determination is true and said camera is set to a second mode.

18. A camera having a built-in flash system, for photographing a subject, the camera comprising:

a lens having an optical axis;

a first flash unit of which a portion is directly above said optical axis when the camera is oriented in a standard photographing position;

a second flash unit located on the front surface of the camera and of which no portion is directly above said optical axis; and wherein said first flash light emitting unit and said second flash light emitting unit simultaneously emit light only when said distance determining unit determines that the subject is closer to the camera than a first prescribed distance.

19. A camera having a built-in flash system, for photographing a subject, the camera comprising;

a lens having an optical axis;

a first flash unit of which a portion is directly below said optical axis when the camera is oriented in a standard photographing position;

a second flash unit located on the front surface of the camera and of which no portion is directly above said optical axis; and wherein said first flash light emitting unit and said second flash light emitting unit simultaneously emit light only when said distance determining unit determines that the subject is closer to the camera than a first prescribed distance.

20. A method of controlling a first flash unit positioned adjacent to a lens of a camera and a second flash unit positioned a distance further than the first flash unit from the lens, the method comprising:

making a determination whether the subject is greater than a predetermined distance from the camera;

emitting a first amount of light from said second flash unit if said determination is true;

pre-emitting light from said first flash unit when said determination is true and said camera is set to a first mode;

emitting no light from said first flash unit when said determination is true and said camera is set to a second mode; and emitting said first amount of light from said first flash unit and a second amount of light less than said first amount of light from said second flash unit if said determination is false.

* * * * *